Jan. 30, 1945. G. A. LYON 2,368,229
METHOD OF MAKING WHEEL COVERS
Filed May 7, 1941 2 Sheets-Sheet 1
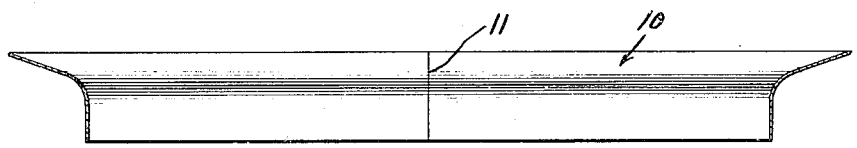
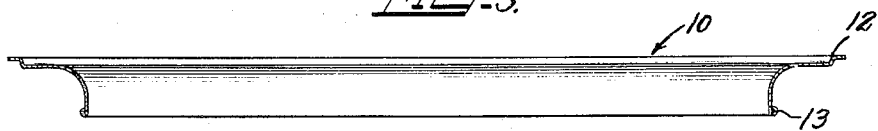
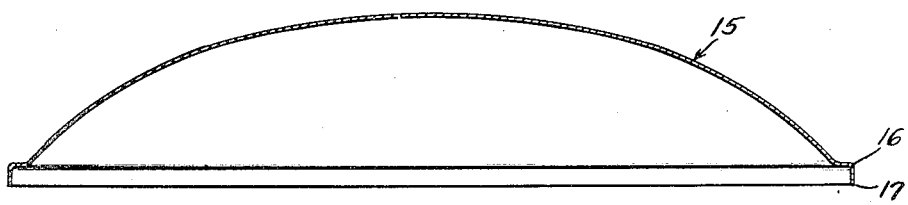
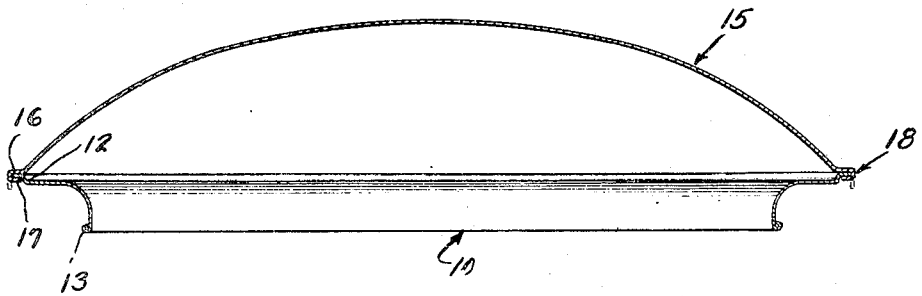
Inventor
GEORGE ALBERT LYON.

Jan. 30, 1945. G. A. LYON 2,368,229
METHOD OF MAKING WHEEL COVERS
Filed May 7, 1941 2 Sheets-Sheet 2
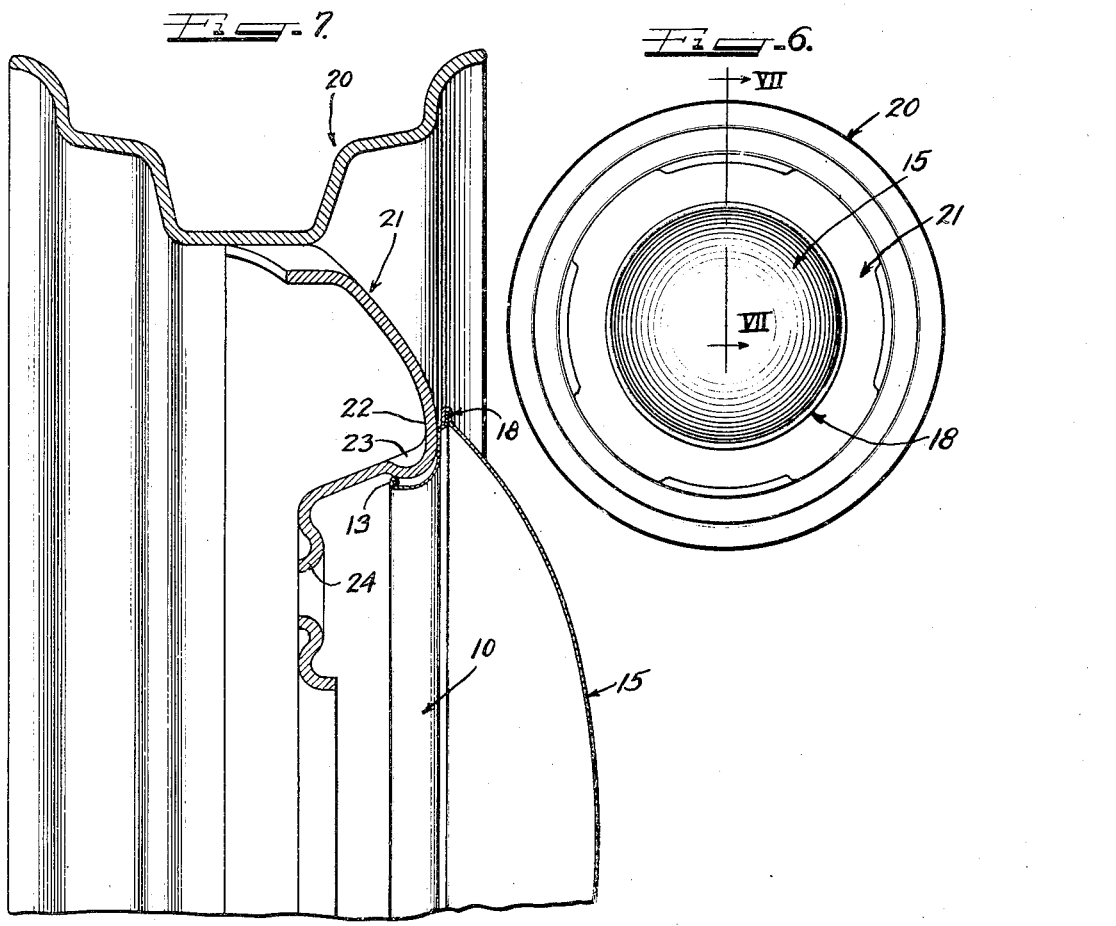
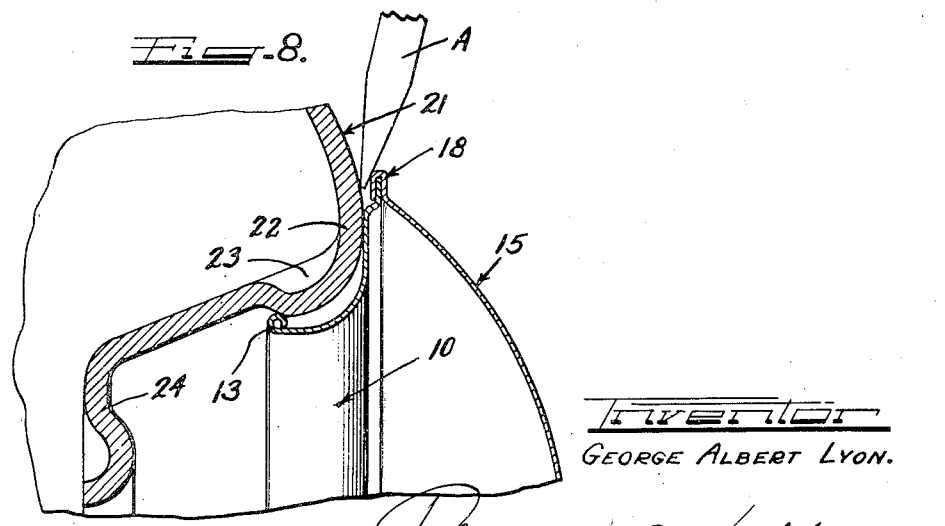
Inventor
GEORGE ALBERT LYON.
by Charles A. Hill Attys.

Patented Jan. 30, 1945

2,368,229

UNITED STATES PATENT OFFICE 2,368,229

METHOD OF MAKING WHEEL COVERS

George Albert Lyon, Allenhurst, N. J.

Application May 7, 1941, Serial No. 392,224

1 Claim. (Cl. 29—159)

This invention relates to a method of making a wheel cover or hub cap, and more particularly to a method of making a multi-part wheel cover in which the parts are joined together in a simple but unique manner.

An object of this invention is to provide a simpler and more economical method of manufacturing wheel covers such as hub caps and wheel disks.

Another object of this invention is to provide a method of making a multi-part wheel cover including crown and ring parts which permits of the manufacture of the ring part of strip stock and the manufacture of the crown part from a blank in such a way that less waste occurs in the fabrication of these parts from metal or the like.

In accordance with the general features of this invention, there is provided a method of making a wheel cover including a ring and a crown part which comprises rolling from strip stock a split ring of angular cross section, joining the ends of the ring together, pressing the ring transversely to give the marginal portion thereof a predetermined configuration, applying a circular crown part of convex-concave cross section to said ring with the marginal portion of said crown part over said marginal portion of the ring, and interlocking these marginal portions to make said ring integral with said crown part and to constitute a rearwardly extending skirt on the ensuing cover or hub cap.

Another feature of the invention relates to the interlocking of the two parts of the cover or hub cap in such a way that one of the edges of one of these parts is turned around and over an edge of the other part thus providing the ensuing cover with a seamed and reinforced outer edge which is better able to withstand the pressure of a pry-off tool used in the prying loose of the cover from a wheel.

Still another feature of the invention relates to so interlocking the outer edges of the two parts of the cover noted above as to cause the ensuing seam to be offset with respect to the spider of the wheel when the cover is in use, whereby a space is provided between the seam and the spider for the insertion of the edge of a pry-off tool between the seam and the spider.

Other objects and features of this invention will more fully appear from the following detailed description taken in connection with the accompanying drawings which illustrate a single embodiment thereof, and in which:

Figure 1 is a cross sectional view illustrating one of the first steps in my process which comprises forming a split ring part;

Figure 2 is a cross sectional view of the same ring part shown in Figure 1 but illustrating how it is shaped and sized after the ends of the split part have been joined together;

Figure 3 is a cross sectional view similar to Figure 2 but showing how one edge of the part is turned or beaded to reinforce the same;

Figure 4 is a cross sectional view showing a crown part formed in accordance with other steps of my method;

Figure 5 is a cross sectional view of the two parts in the process of being assembled and lock-seamed together;

Figure 6 is a side view of a wheel to which my novel wheel cover has been applied;

Figure 7 is an enlarged fragmentary cross sectional view taken on the line VII—VII of Figure 6 looking in the direction indicated by the arrows and showing the manner in which the wheel cover formed in accordance with my method cooperates with the spider of a wheel; and Figure 8 is an enlarged cross sectional view corresponding to a portion of the center of Figure 7 and illustrating very clearly the manner in which the ring part of my novel cover cooperates with the nose of the wheel spider.

As shown on the drawings:

One of the first steps of my method is to form a split ring or annular member 10 of an angular cross sectional shape. This ring may be formed from strip stock by suitable rolling operations. The stock, for example, may comprise a relatively low carbon steel such as .25 to .30 carbon steel. Moreover, by rolling the ring from strip stock instead of blanking it from a sheet it is possible to eliminate the waste which would occur in the blanking operation.

As shown in Figure 1, the ring 10 is of an angular cross sectional shape and has adjoining ends as designated at 11.

The next operation in the fabrication of the ring comprises welding the ends 11 together so as to cause the ensuing ring to be a continuous one, as shown in Figure 2. Also, the ring is placed in a press to give it a predetermined cross sectional shape, as shown in Figure 2, including an offset flattened marginal portion 12. During this press operation the ring is not only shaped, but it is also properly sized.

In addition thereto, an edge of the ring which is to constitute the retaining edge of the ensuing cover is rolled or turned as designated at 13 in Figure 3. This provides the ring with a reinforced continuous flexible edge.

The other part of my novel wheel cover or hub cap comprises a crown part 15, as shown in Figure 4, which is of a convex-concave cross sectional shape. This part is formed from suitable sheet stock in suitable press equipment. During the formation of the part 15 by pressing operations, its outer marginal portion is cupped and flattened as designated at 16, thus providing the crown part with a substantially straight outer edge or marginal portion 17.

In Figure 5, I have illustrated the operations of assembling the two parts 10 and 15 of my cover together. During these operations the part 15 is placed over the part 10 with the flattened portion 16 of the crown part resting on the flattened marginal edge portion 12 of the ring. The straight edge portion 17 of the crown part 15 is then pressed from the dotted line position shown in Figure 5 to the full line position. In other words, this flattened edge portion 17 is turned around and under the flattened marginal portion 12 of the ring part so as to interlock or lockseam the two parts together. This provides the ensuing wheel cover or hub cap with a multiple thickness outer peripheral edge designated generally by the reference character 18. In other words, the seam rigidifies the outer edge of the cover, which edge is adapted to have a pry-off force applied thereto in the ejection of the cover from a wheel spider which I shall now describe in conjunction with Figures 6, 7, and 8.

It should first be noted that the crown part 15 may be made from any suitable sheet material such as chrome steel and that it may have a highly lustrous outer finished surface.

In Figures 6, 7, and 8, I have illustrated how my novel wheel cover or hub cap is intended to cooperate with a wheel, as well as the importance of the different structural features of the cap with regard to its use in a wheel assembly.

The reference character 20 designates generally a drop center type of tire rim which is of conventional construction. Attached to the base of this rim is the usual wheel spider 21 which is of a convex-concave construction and at its center includes a bulged and curved nose portion 22. This nose portion 22 is curved radially and axially inwardly and is provided with a plurality of spaced protuberances 23 for retaining cooperation with the flexible continuous edge 13 of my novel wheel cover. The central portion of the ring-like spider 21 is formed into the usual attaching flange 24 by means of which the wheel is bolted in place on an axle assembly.

As best shown in Figure 8, it is clear that the ring part 10 of my cover is of such a concave cross sectional or curved shape that it closely follows the contour of the nose portion 22 of the spider. The cover is adapted to be applied to the wheel by pressing it axially into position. During the application of the cover to the wheel, the continuous flexible and beaded edge 13 is buckled or distorted as it passes over the high points of the bumps 23. Thereafter, this edge springs radially outwardly into tight retaining engagement with the rear surfaces of the bumps. The edge, however, does not completely return to its original position and hence exerts a retaining pressure on the bumps of the spider.

It will also be perceived from Figure 8 that the seamed outer edge 18 of the cover is axially offset with reference to the plane of the nose of the spider, so that a space is provided between the seamed edge 18 and the outer face of the spider in which space the edge of a pry-off tool such as a screwdriver A is adapted to be inserted. It follows that since the edge 18 is reinforced by a multiple of thicknesses of material the cover can better withstand the pressure exerted by the pry-off tool in the act of forcibly prying the cover free from its cooperation with the spider.

I claim as my invention:

The method of making a wheel cover including ring and crown parts which comprises forming at the peripheral portion of the crown part a radially extending flange and an axially extending skirt, forming at the peripheral portion of the ring part a radially extending flange offset in the direction of the crown portion, placing the offset, radially extending flange of the ring part against the radially extending flange of the crown part and forming the skirt around the radially extending, offset flange of the ring part to interlock the cover parts and to form contemporaneously therewith a multiple thickness flange offset radially and axially from the main body of the ring to afford an under surface of the flange accessible in use for the application of an edge of a pry-off tool thereto during removal of the cover from a wheel.

GEORGE ALBERT LYON.